United States Patent [19]

Siegel et al.

[11] 4,269,343
[45] May 26, 1981

[54] DESOLDERER AND HEATER ASSEMBLY FOR USE THEREWITH

[75] Inventors: William J. Siegel, Silver Spring, Md.; Walter Lee, Springfield, Va.; Alexander J. Vella, Derwood, Md.

[73] Assignee: Pace Incorporated, Laurel, Md.

[21] Appl. No.: 934,976

[22] Filed: Aug. 18, 1978

[51] Int. Cl.³ .............................................. B23K 3/04
[52] U.S. Cl. ...................................... 228/20; 228/51; 219/230
[58] Field of Search ...................... 228/20, 19, 51-55, 228/264; 219/230

[56] References Cited

U.S. PATENT DOCUMENTS

| | | | |
|---|---|---|---|
| 3,163,145 | 12/1964 | Duhaime et al. | 228/20 |
| 3,245,597 | 4/1966 | Kopernak | 228/20 |
| 3,392,897 | 7/1968 | Siegel | 228/20 |
| 3,422,247 | 1/1969 | Royston et al. | 228/20 |
| 3,469,759 | 9/1969 | Wansink | 228/20 |
| 3,637,129 | 1/1972 | Kaufman | 228/51 |
| 3,690,539 | 9/1972 | Geiger | 228/20 |
| 3,842,240 | 10/1974 | Wakita et al. | 228/20 |
| 3,910,479 | 10/1975 | Köhler | 219/230 |
| 3,970,234 | 7/1976 | Litt et al. | 228/20 |
| 4,023,724 | 5/1977 | Wakita et al. | 228/20 |

FOREIGN PATENT DOCUMENTS 2644946 4/1978 Fed. Rep. of Germany ........... 219/230
1089172 11/1967 United Kingdom ...................... 228/20

Primary Examiner—Daniel C. Crane
Attorney, Agent, or Firm—Gerald J. Ferguson, Jr.; Joseph J. Baker

[57] ABSTRACT

A desolderer and heater assembly therefor wherein the heater assembly includes at least a heating element and a solder transfer means where the forward end of the solder transfer means is adapted to receive a desoldering tip and where the thermal characteristics of the rear end portion of the solder transfer means are such that the heater element raises the rear end portion of the solder transfer means to a solder melting temperature shortly after the tip reaches this temperature. The desolderer includes a solder collection chamber into which molten solder is ejected from the solder transfer means where the solder collection chamber may be disposed either inside or outside the desolderer handle. Various embodiments are described whereby the heater assembly may be adapted to receive a seal mounting member so that the forward end of the solder collection chamber can be sealed at a surface which is removed from the path the molten solder traverses through the solder transfer means.

49 Claims, 15 Drawing Figures

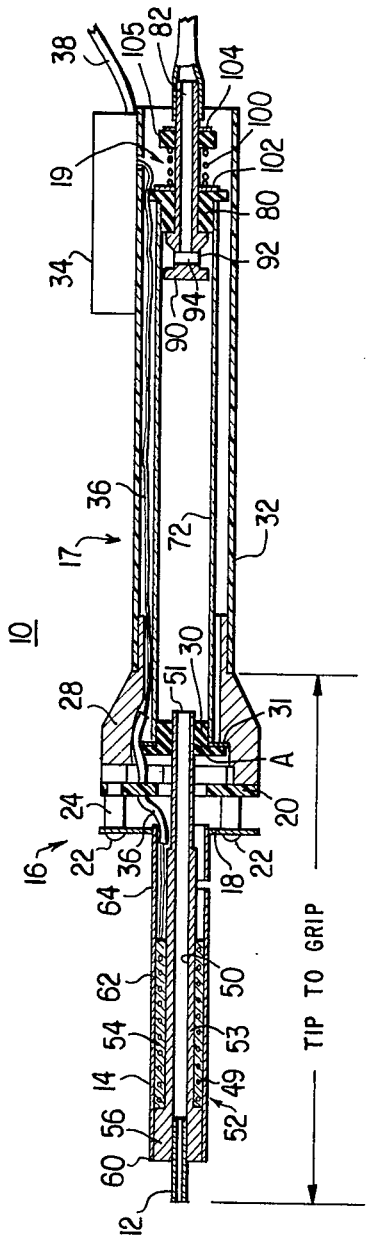
FIG. 1 (PRIOR ART)
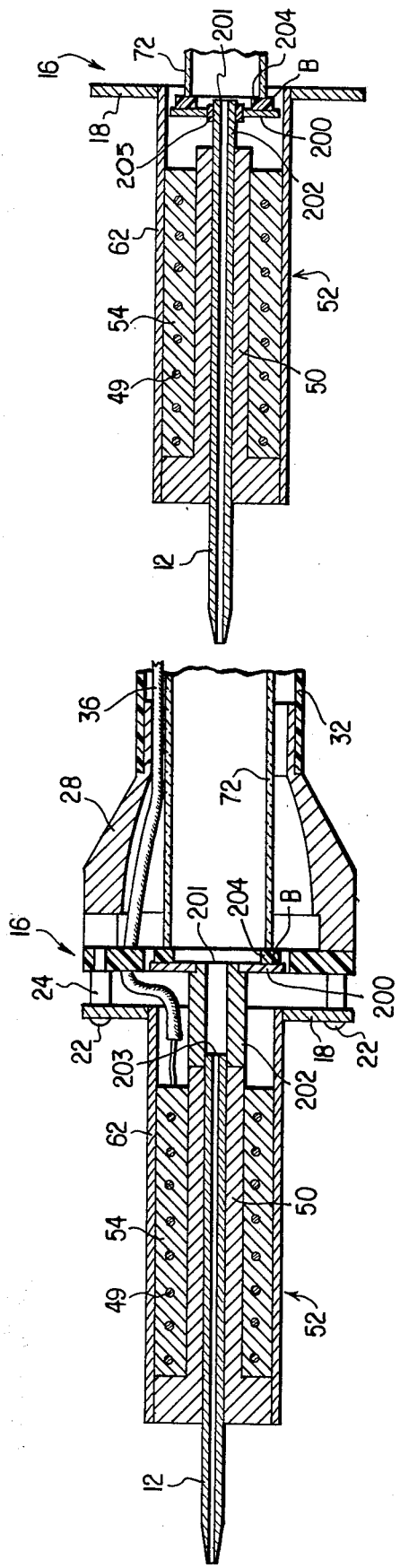
FIG. 2
FIG. 3

FIG. 11
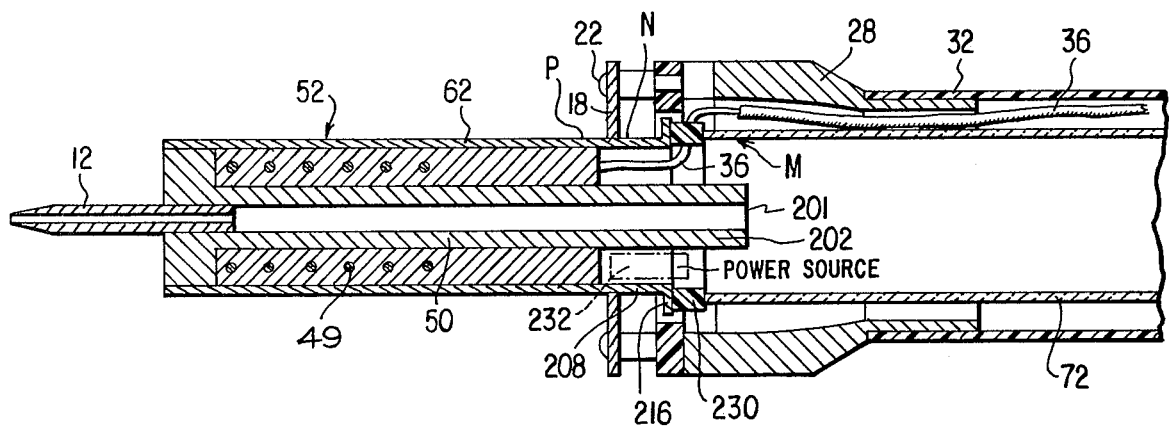
FIG. 12
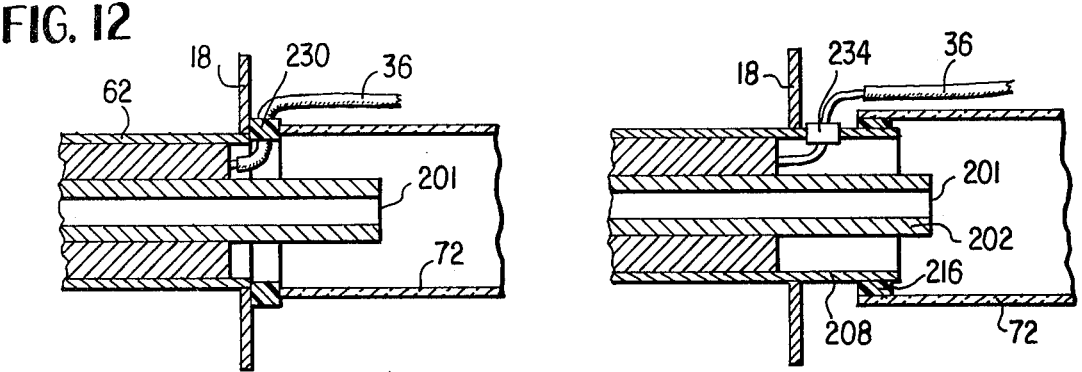
FIG. 13
FIG. 14
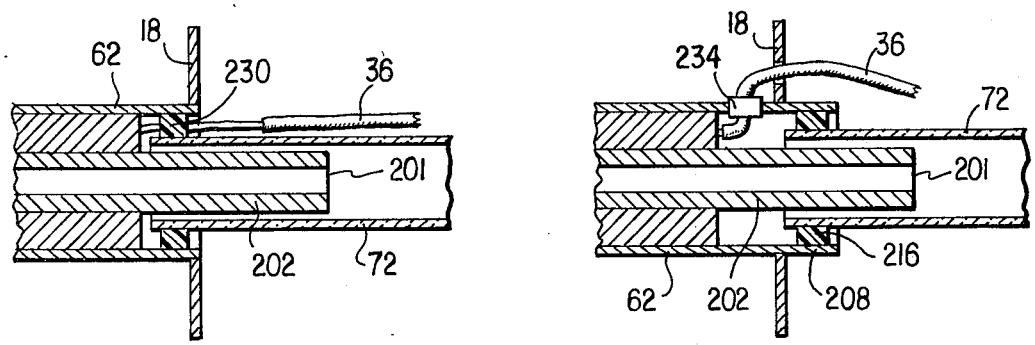
FIG. 15

DESOLDERER AND HEATER ASSEMBLY FOR USE THEREWITH

BACKGROUND OF THE INVENTION

1. Field of the Invention

This invention relates to desolderers and heater assemblies for use therewith.

2. Discussion of the Prior Art

In FIG. 1, there is illustrated a desolderer which corresponds to that shown in FIG. 6 of U.S. Pat. No. 3,392,897 granted to W. J. Siegel and assigned to the assignee of the present application, the foregoing patent being incorporated herein by reference. Other prior art references of interest related to U.S. Pat. No. 3,392,897 are U.S. Pat. Nos. 3,422,247; 3,469,759 and 4,023,724.

Referring to FIG. 1, the desolderer 10 may comprise a removable tubular tip 12 which extends forward from a heater assembly 14. Rearward of heater assembly 14 is thermal baffle assembly 16, then handle assembly 17 and finally a vacuum fitting assembly 19.

Referring to heater assembly 14, a metallic tube 50 may have a resistance wire heating element 49 wound thereabout and an insulating ceramic 54 around the resistance wire where elements 49 and 54 together comprise heating element 52. Tube 50 may be formed by machining down one end of a bi-metallic tubular blank, having an outside tube of copper and an inner thinner tube of steel, to the relatively thin steel tube at rear end portion 51. At the untouched central portion 53 of the copper-steel bi-metallic tube, resistance wire 52 and ceramic insulator 54 may be placed. A terminal shoulder or flange 60 on which a sleeve 62 seats may be provided on a thick forward end portion 56 of tube 50.

A plurality of elongated circumferential slits 64 may be cut into sleeve 62 near the rearward terminus thereof to provide a thermal barrier between the front and rear ends of sleeve 62. In a similar manner the thin character of the wall at rear portion 51 of tube 50 acts to diminish conduction of heat rearward from resistance heater wire 52.

Axially rearward of sleeve 62 is thermal barrier assembly 16 formed by a pair of axially spaced apart circular plates 18 (metal) and 20 (non-metallic). Plates 18, 20 may each have a relatively large central aperture therein. The plates 18 and 20 may be maintained in their spaced apart relation by a plurality of screws 22 (or bolts) and spacer elements 24 symmetrically disposed near the periphery of plates 18, 20. At its rearward terminus sleeve 62 is attached (e.g. press fit, swaged, etc.) to plate 18 at the bounding edge of its central aperture. The essentially open air space provided between plates 18, 20 acts as thermal insulation between sleeve 62 and handle assembly 17 of solder extractor 10. Moreover the same air space acts to cool the exposed rear portion 51 of central tube 50 which extends through the central apertures of plates 18, 20.

A hollow hub 28, desirably of non-metallic construction (e.g. wood, bakelite), may be mounted on the back face of plate 20. The rearmost extent of tube 50 passes through the central aperture in plate 20 to a termination inside hub 28 at a forward seal 30, which may be of silicone rubber. Seal 30 is disposed between the bounding edges of the central aperture on plate 20 and hub 28 being maintained there by a washer member 31 which bears against the flanged rim of seal 30 and the body of hub 28 at recesses 33 therein.

Rearwardly of hub 28 from a circular seat thereon extends tubular handle grip 32 which may be formed of glass or of a transparent plastic. Handle grip 32 and hub 28 are the held parts of solder extractor 10. The power supply cord 28 may end at a junction box 34 mounted at the end of grip 32. From junction box 34 electrical leads 36 pass inside handle grip 32 then internally of hub 28, through an aperture in plate 20 and inside of sleeve 62 to the resistance wire heating element 52. The ground wire may be grounded to rear portion 51 of tube 50.

Central tube 50 extends rearwardly into hub 28 to forward seal 30. Seated on forward seal 30 is a solder collection chamber 72. This solder catcher tube 72 may comprise an elongated open cylinder which is sealed at its forward end by seating on forward seal 30 and at its rearward end by seating on the hollow (rubber) rear seal 80. A passage for flow of molten solder is provided by tip 12, tube 50 and chamber 72. Application of vacuum to vacuum fitting assembly 19 at the rear of chamber 72 transmits suction to the forward end of tip 12.

The vacuum fitting assembly 19 may include rear seal 80. Extending therethrough may be a baffle tube 82 whose front end is shaped into a flat imperforate base 90 and a reduced neck 92 having a radial hole 94. Rearward of seal 80 may be a spring biased bayonet lock formed by a spring 100, spring plate 102, a grooved stop or retainer 104 and lock member 105. The vacuum fitting assembly serves to retain chamber 72 inside handle grip 32 but readily removable therefrom.

In operation, desolderer 10 is applied in a well known manner to a terminal or the like which is to be desoldered. Although desolderer 10 is useful in many applications, it is desirable in many instances to work in very close quarters where the operator must be able to exercise fine control over the desoldering operation. The operator is aided in doing this, the shorter the tip-to-grip dimension is. This dimension is indicated in FIG. 1.

Accordingly, it is an important object of this invention to provide an improved desolderer having a short tip-to-grip dimension to thereby permit the operator to exercise more control over the desoldering operation.

As will be brought out in more detail hereinafter, a shortened tip-to-grip dimension is compatible with the employment of a smaller heater 52 whereby less wattage is needed to produce the same tip temperature as that produced by desolderer 10 of FIG. 1. Further, not only does the smaller heater make the desolderer more efficient but it also has less tendency to raise the temperature of handle 32. Since the handle temperature typically should not rise above about 120° F. to ensure operator comfort, this, of course, is another important advantage of being able to employ a smaller heater.

Accordingly, it is another important object of this invention to provide an improved desolderer having a small heater whereby the desolderer operates more efficiently than conventional desolderers while at the same time there is less tendency for the handle of the desolderer to rise to an uncomfortable temperature for the operator.

It has typically been necessary to employ a relatively high wattage heater 52 in desolderer 10 of FIG. 1 so that the heat produced by heater 52 raises not only the temperature of tip 12 to a point where solder can be melted but also raises the temperature of the rear end 51 of tube 50 to a point where the molten solder will remain molten as it traverses from tip 12 to rear end portion 51 under the influence of the vacuum applied through assembly 19. Otherwise, the molten solder will tend to solidify before it reaches rear end portion 51 and thus clog or otherwise impede the passageway through tube 50.

It is thus a further object of this invention to provide an improved desolderer wherein a small heater may be employed and yet the tip and rear end of the solder transfer tube thereof are both maintained at at least the solder melting temperature.

Not only is it desirable to maintain both the tip and the rear end of the solder transfer tube at the solder melting temperature, but it is also desirable the tip be maintained at a temperature higher than that of the rear end of the transfer tube. Otherwise, the intermediate portion of the desolderer tends to draw more heat from the heater 52 than does tip 12 whereby the heater efficiency is diminished and the intermediate portion of the desolderer tends to overheat.

It is thus a further object of this invention to provide an improved desolderer wherein the tip is maintained at a higher temperature than the rear end of the solder transfer tube.

It is further desirable that the rear end of the solder transfer tube be raised to the solder melting temperature shortly after the temperature at tip 12 is raised to this temperature. When the FIG. 1 desolderer is first energized, tip 12 may reach the solder melting temperature in three minutes, for example, while rear end portion 51 may sometimes require 15 minutes, for example, to reach this temperature. Thus, if the operator uses the desolderer six minutes after it has been energized, he will initially be able to desolder a terminal connection; however, due to the fact that rear portion 51 has not reached the solder melting temperature, the molten solder formed at tip 12 may re-solidify in tube 50 before it reaches rear portion 51. Such solidification of the solder in tube 50 may cause blockage and is, of course, contrary to the desired object of maintaining the solder in its molten state until it reaches tube 72 where it may be collected.

Thus, it is a further object of this invention to provide an improved desolderer where the rear portion of the solder transfer tube is raised to the solder melting temperature shortly after the tip reaches this temperature.

As discussed above, not only does a large heater tend to be inefficient, but it also tends to increase the tip-to-grip dimension. That is, this dimension tends to be increased in order to provide a sufficiently long path (that is, sufficiently drop the temperature) from the heater to grip 32 whereby the grip may be maintained at a comfortable temperature for the operator. In the FIG. 1 desolderer, circumferential slits 64 are employed to assist in dropping the temperature along the support path which extends from heater 52 to handle 32 via sleeve 62, plate 18, screws 22, plate 20 and hub 28. Further, the air space between plates 18 and 20 is also an important factor in dropping the temperature along the foregoing path. Nevertheless, in the FIG. 1 embodiment, sleeve 62 has been elongated and preferably provided with circumferential slits 64 to assist in lowering the handle temperature to a comfortable level. However, this does result in a lengthening of the tip-to-grip dimension with an attendant diminution in operator control over the desolderer. Thus, by being able to employ a smaller heater in accordance with an important aspect of this invention, sleeve 62 need not be so long nor need it be provided with elongated slits 64 and yet the temperature at handle 32 can be reduced to a point comfortable for the operator.

Another factor which tends to raise the temperature of the handle 32 is the presence of the heated rear end portion 51 of tube 50 within the handle as can be seen in FIG. 1. As stated above, the rear portion 51 must be maintained at a solder melting temperature (typically 375° F.) while the grip should be at a temperature of no more than 120° F.

Accordingly, it is another important object of the present invention to provide an improved desolderer where in conjunction with other features of the invention, the rear end of tube 50 is not disposed within handle 32 and where it may, for example, be disposed within air space 16 or within sleeve 62 to thereby remove it from the handle and thus prevent it from tending to raise the handle temperature to a level uncomfortable for the operator.

There has now been described two paths by which heater 52 can heat handle 17 to an uncomfortable level. The first one is via the support path including sleeve 62, plate 18, screws 22 and hub 28, while the second one is via tube 50 to rear end portion 51.

It is a further important object of this invention to provide an improved desolderer whereby either or both of these paths are modified to thereby prevent the tendency for the handle temperature to rise to an uncomfortable level and/or to substantially lessen the tip-to-grip dimension of the improved desolderer compared with conventional desolderers.

As stated above, it is necessary to maintain the inner walls from tip 12 to rear end 51 of tube 50 at the solder melting temperature. Otherwise, the molten solder tends to re-solidify and clog tube 50. However, the necessity of maintaining rear end 51 at the solder melting temperature introduces a complication in that the seal surface A (FIG. 1) between seal 30 and rear end portion 51 is also raised to approximately this high temperature. Hence, there is a tendency for seal 30 to be short-lived since it is separated from the interior wall of tube 50 only by the thickness of the tube. From the foregoing it can be appreciated there are conflicting requirements to be met at the rear portion of tube 50. First, portion 51 should be hot enough to ensure that the solder is still in its molten state as it is ejected into collector tube 72. However, portion 51 should be cool enough to permit the formation of an effective, long-lived seal at the front end of collector tube 72. Otherwise, the vacuum applied through fitting 19 will not be efficiently transmitted to tip 12. Although there are provisions in U.S. Pat. No. 3,163,145 and U.S. Pat. No. 3,970,234 (assigned to the assignee of the present invention) for providing a separate seal point on the transfer tube, there is no explicit recognition in either of these patents of substantially dropping the temperature at the seal point with respect to the transfer tube to thereby provide a relatively cool seal point.

Accordingly, it is another important object of the present invention to provide an improved desolderer wherein the solder can be maintained in a molten state until it reaches the collection tube while at the same time the forward end of the tube can be sealed at a point which is maintained at a temperature which enhances seal longevity and effectiveness.

As discussed above, there are basically two rearward heat paths from heater 52 of FIG. 1. One extends to handle 17 via the support path (that is, sleeve 62, screws 22 and hub 28) while the other extends to solder collector tube 72 via tube 50 and seal 30. As also discussed above, the latter path serves two purposes which tend to conflict with one another—that is, (1) the maintenance of the solder in a molten state until it reaches tube 72 and (2) the provision of a surface upon which seal 30 can be mounted.

Hence, in accordance with a further important object of this invention there is provided an improved desolderer wherein three separate paths are provided. The first of these paths generally corresponds to the support path defined by sleeve 62, plate 18, screws 22, plate 20 and hub 28 of FIG. 1. The second of these paths is employed solely for the purpose of maintaining the solder in a molten state until it reaches solder collector tube 72 and the third path is employed for providing a surface upon which the forward end of collector tube 72 can be sealed.

It is a further object of this invention to provide an improved desolderer wherein the path including sleeve 62 of FIG. 1 also includes means for providing a seal for the forward end of collector tube 72 whereby only two paths extend rearwardly from heater 52.

From the foregoing, it can be seen that in addition to the paths extending rearwardly from the heater, there is, of course, the forward path extending to the tip. Accordingly, it is a further important object of this invention to so implement the various paths extending from the heater that the most heat is directed to the tip whereby the highest temperature of the desolderer is located at the tip. The path which draws the next greatest amount of heat extends through the transfer tube whereby the solder may be maintained in a molten state until it is ejected from the tube into the solder collector tube. The path which draws the least amount of heat is that which is connected to the seal for the forward end of the solder collector tube. If the support path including sleeve 64 is not also the path to the seal, the support also draws a small amount of heat.

Together with the above characteristics, it is an important object of this invention to provide a desolderer having all or most of the following features: (1) short tip-to-grip dimension, (2) small heater, (3) comfortable handle temperature, (4) solder maintained in molten state until ejected into solder collector tube, (5) rear end of solder transfer tube reaches solder melting temperature shortly after tip does whereby operator may, for example, use desolderer as soon as solder is quickly melted, (6) seal at forward end of solder collector tube is maintained at a relatively cool temperature and (7) tip is maintained at a higher temperature than rear end of solder transfer tube, which in turn is maintained at higher temperature than seal point for forward end of solder collector tube.

It is a further object of this invention to provide an improved desolderer combining all or many of the above features wherein the desolderer may be of (1) the in-line type (either straight or curved) disclosed in aforementioned U.S. Pat. No. 3,392,897, where the solder collector is disposed within the handle, (2) the parallel collector tube type as disclosed in aforementioned U.S. Pat. No. 3,163,145 (which is incorporated herein by reference) where the collector tube is outside and usually parallel to the handle although it need not necessarily be parallel or (3) a "hammer head" type where the heating element is arranged at an angle with respect to the handle and where the collector tube is typically parallel to the handle, the "hammer head" type (3) differing from the parallel collector tube type (2) basically in that in the type (2) desolderer the heating element is substantially aligned with the handle while in the "hammer head" type (3), the heating element is angularly disposed with respect to the handle.

It is a further object of this invention to provide an improved heater assembly for use in a desolderer, the heater assembly including at least a heating element and a solder transfer means where the forward end of the solder transfer means is adapted to receive a desoldering tip and where the thermal characteristics of the rear end portion of the solder transfer means are such that the heating element raises the rear end portion of the solder transfer means to a solder melting temperature shortly after the tip reaches this temperature.

It is a further object of this invention to provide an improved heater assembly which is adapted to receive a seal mounting means which provides a sealing surface for a seal for the forward end of the solder collection chamber of a desolderer, the sealing surface being separated from the path through which molten solder traverses in the desolderer.

Other objects and advantages of this invention will be apparent from a reading of the following specification and claims taken with the drawing.

BRIEF DESCRIPTION OF THE DRAWING

FIG. 1 is a cross-sectional view of an illustrative prior art desolderer.

FIG. 2 is a cross-sectional view of an illustrative first embodiment of a desolderer in accordance with the invention.

FIGS. 3-5 are cross-sectional views of various illustrative modifications of the embodiment of FIG. 2.

FIG. 11 is a cross-sectional view of a further embodiment of the invention.

FIGS. 12-15 are cross-sectional views of further modifications of the embodiment of FIG. 11.

DETAILED DESCRIPTION OF PREFERRED EMBODIMENTS

Figure 4:
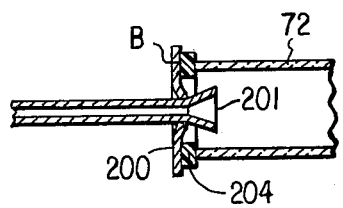

Reference should be made to the drawing where like reference numerals refer to like parts.

Referring to FIG. 2, there is shown an illustrative first embodiment of the invention which differs from FIG. 1 in a number of important respects, it being understood that the vacuum fitting assembly 19 of FIG. 1 or any other vacuum fitting assembly may be employed with FIG. 2.

In FIG. 2, a flange 200 may be provided at the end of a solder transfer tube 202, which, in turn, may be integrally formed with (or attached to) a tubular core 50. Preferably, tube 202 has a lower heat conductivity and/or a higher specific heat than that of forward tip 12. Thus, tip 12 can be maintained at a higher temperature than rear portion 201. The foregoing relative thermal characteristics are effected in the FIG. 1 embodiment, as discussed hereinbefore, by machining down one end of a bi-metallic tube blank, having an outside tube of copper and an inner thinner tube of steel, to the relatively thin tube to thereby form the rear portion 51 of tube 50. However, as stated hereinbefore with respect to the FIG. 1 embodiment, there tends to be substantial delay in rear end portion 51 heating up to the solder melting temperature which thereby tends to cause the tube 50 to clog if it is used too soon after the tip 12 reaches this temperature. This problem is avoided in the FIG. 2 embodiment whereby the length of transfer tube 202 is substantially shortened with respect to the rear end portion 51 of the FIG. 1 embodiment. Accordingly, the rear end portion 201 of tube 202 reaches the solder melting temperature shortly after the tip 12 does. The foregoing may be facilitated somewhat by extending the rear end 203 of tip 12 into transfer tube 202 as shown in FIG. 2.

As indicated above, the thermal characteristics of transfer tube 202 with respect to tip 12 are preferably such that more heat is drawn by tip 12 to thereby maintain the temperature of tip 12 at a higher level than that of tube 202. Further, the thermal characteristics of tube 202 are preferably such that rear portion 201 reaches the solder melting temperature shortly after the tip 12 does. The thermal characteristics of tube 202 are a function of at least the material of which the tube is made, together with its thickness and length. Preferably the thermal characteristics of tube 202 are such that the thermal conductivity is less than and/or the specific heat thereof is greater than that of the tip whereby the tip is maintained at a higher temperature than rear portion 201. Further, the length (another thermal characteristic) is such that the rear portion 201 rises to the solder melting temperature shortly after the tip 12 does. In fact, as a matter of convenience for the operator, the desolderer should be ready for use as soon as the tip quickly melts solder—that is, at this time the rear portion 201 will be at the solder melting temperature. Typically, the rear portion 201 should reach the solder melting temperature within three minutes, and preferably one minute, after tip 12 reaches this temperature. Solder collection chamber 72 is sealed to flange 200 at a radial distance removed from the inner wall of rear portion 201, the seal being effected by an annular, face seal 204. Thus, temperature at surface B of the face seal may be substantially reduced with respect to that at rear portion 201 due to the low heat conductivity/high specific heat material preferably employed for flange 200. The different thermal characteristics of (1) tip 12, (2) transfer tube 202 and (3) flange 200 may be effected in a number of different ways, as discussed hereinbefore. Further, it is to be understood the foregoing considerations regarding the various factors effecting thermal characteristics apply to all other embodiments of the invention.

Since tube 202 is shorter than and may have a higher heat conductivity and/or lower specific heat than the rear end portion 51 of the FIG. 1 desolderer, it is easier to raise the temperature of the rear portion 201 of the FIG. 2 desolderer and to maintain it at the solder melting temperature. Accordingly, a smaller heater 52 may be employed. Further, since a smaller heater is employed, there is less heat transmitted via sleeve 62, plate 18, screws 22 and hub 28 to handle 32. Thus, the need for the circumferential slits 64 of FIG. 1 in sleeve 62 may be avoided to thereby effect a shortening of the tip-to-grip dimension. As stated hereinbefore, this in turn permits finer operator control over the desoldering operation in close quarters.

A further factor permitting the use of a smaller heater is the disposition of rear portion 201 of tube 200 (or the forward end of solder collector tube 72) at a point in front of handle 32 whereas in the FIG. 1 embodiment, the rear end portion 51 is disposed within the handle as discussed hereinbefore. In fact, in FIG. 2, the rear portion 201 is disposed within the air thermal barrier 16 established between plate 22 and hub 28. By positioning rear portion 201 in air space 16, there is less tendency for handle 32 to be heated to an uncomfortable temperature. That is, as stated hereinbefore, portion 201 should be maintained at the solder melting temperature to ensure the solder ejected into tube 72 is in the molten state; however, such high temperature tends to unduly increase the handle temperature when it is disposed within the handle. By removing it from the handle, the handle temperature accordingly tends to be reduced. Thus, even though circumferential slits 64 are removed from sleeve 62, as discussed above, which tends to raise the temperature of handle 32, this tendency for the temperature to rise is offset by the fact that rear portion 201 may be located in front of handle 32 and/or by the fact that a smaller heating element 52 is employed. The foregoing considerations relating to reduced heater size and decreased tip-to-grip dimension also apply to the remaining embodiments of the invention discussed hereinafter.

As indicated above, there are a number of different ways the desired temperature differential between rear portion 201 and sealing surface B of seal 204 can be achieved. Thus, tube 202 may be made of a single material, such as a copper alloy, while the flange 200 may either be made of a different material such as steel or alumina and/or may be substantially thinner than tube 202. Further, flange 200 may be attached to rear portion 201 by appropriate means such as brazing whereby a sealed connection is made between the flange and the tube.

In the embodiment of FIG. 2, the transfer tube 202 is an integral part of (or attached to) tube 50. However, other means may be employed to provide a path between heater 52 and the forward end of solder collector tube 72. Thus, for example, in FIG. 3, tip 12 is continuous in that it extends through tube 50 and includes integral (or attached) tube portion 202 although as stated hereinbefore, tube portion 202 preferably has a lower thermal conductivity and/or higher specific heat than forward tip portion 12. FIG. 3 is also different from the embodiment of FIG. 2 in that the rear portion 201 is disposed within sleeve 62—that is, in front of air space 16. Accordingly, the rear end portion 201 is even further removed from the handle 32. FIG. 3 also differs from FIG. 2 in that a flexible seal 205 is interiorly mounted in flange 200 so that tube 202 may be passed through the seal whenever tip 12 is exchanged. The remainder of FIG. 3 corresponds to that of FIG. 2.

In FIG. 4, the rear portion 201 is flared to thereby provide a smoother transit of the molten solder into tube 72 while at the same time enhance the temperature differential between the rear portion and sealing surface B of seal 204. The flaring of rear portion 201 can be employed in either of the embodiments of FIGS. 2 and 3 or any of the other embodiments of the invention to be discussed.

Figure 5:
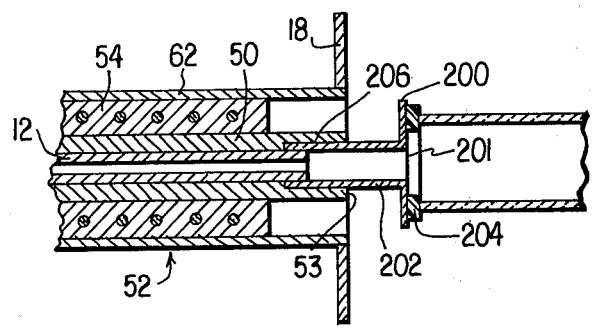

Referring to FIG. 5, the transfer tube 202 is nested in a seat 206 formed in core 50. Core 50 is preferably a high heat conductivity/low specific heat material such as copper alloy. Tube 202 and flange 200 may be made of the same material which has a very low heat conductivity and high specific heat material. The distance between the rear face 53 of core 50 and rear portion 201 of tube 202 is very short—that is, sufficiently short to ensure that the temperature at rear portion 201 can be quickly raised to and maintained at the solder melting teperature. Thus, in this embodiment, rear portion 201 would be disposed either within sleeve 62 or air space 16. Again, the seal 204 is removed from the inner wall of rear portion 201 and thus, it can be maintained at a cooler temperature due to the thermal characteristics of flange 200. The temperature differential can further be enhanced by reducing the thickness of the flange.

In addition to the above discussed advantages of the embodiments of FIGS. 2-5 with respect to that of FIG. 1, it should also be noted in the FIG. 1 embodiment that sealing surface A tends to draw a substantial amount of heat from core 50 thereby making it even more difficult to quickly raise and maintain the rear end portion 51 at the solder melting temperature. However, such is not the case in the embodiments of FIGS. 2-5 where the area of the contacting surface between flange 200 and rear portion 201 is substantially less than that of the area of sealing surface A of FIG. 1. Accordingly, for this further reason, a smaller heater 52 can be employed in the embodiments of FIGS. 2-5 (and the other embodiments of this invention) to produce a solder melting temperature at rear end portion 201.

Figure 6:
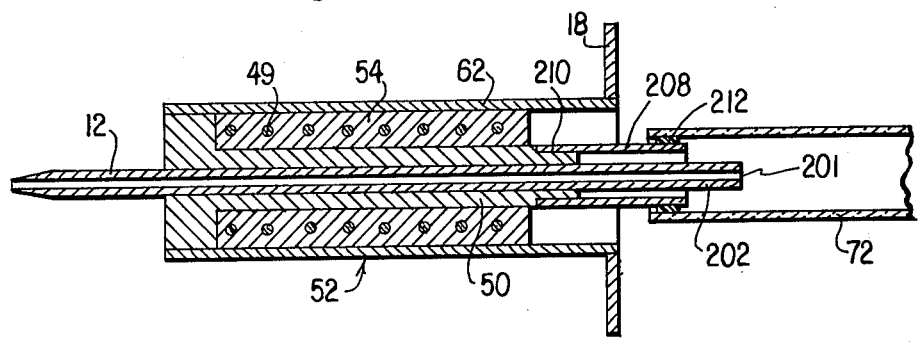
FIG. 6 is a cross-sectional view of an illustrative further embodiment of the invention.

Referring to FIG. 6, another embodiment of the invention is illustrated. This embodiment is different than the embodiments of FIGS. 2-5 in that in the embodiments of FIGS. 2-5 the transfer tube 202 and flange 200 are connected to one another whereby rear portion 201 can be maintained at the solder melting temperature while face seal 204 can be maintained at a temperature substantially less than that of rear portion 201. Thus, effectively a single path, including tube 202 and flange 200, is provided for both the functions of (1) maintaining the solder in a molten state (this occurring at rear portion 201) and (2) providing a seal point for solder collector tube 72 (this occurring at an area radially removed from rear portion 201). Thus, the two different functions effectively occur at different points along a single path whereas in the FIG. 1 embodiment, they occurred at substantially the same point along a single path. Because, in the embodiments of FIGS. 2-5 these two different functions (one which requires a high temperature and the other which requires a cooler temperature) are performed at two different points along a single path, it is possible to so control the thermal characteristics between the two points that a sufficient temperature differential is established whereby the two distinct functions can be efficiently implemented.

In the embodiment of FIG. 6, separate paths are provided for the above-mentioned two functions. Thus, continuous tip 12 of FIG. 6 corresponds to that of FIG. 3. However, no flange is mounted on the end as can be seen in FIG. 6. Rather, it simply extends into solder collector tube 72. Thus, a first path comprising tip portion 12 including integral (or attached) tube portion 202 is provided to perform the function of maintaining the solder in a molten state as it is ejected into tube 72.

A second path is provided from core 50 via mounting tube 208. A stepped surface 210 may be provided on core 50 to permit disposition of tube 208 on core 50. A radial seal 212 provides a seal between mounting tube 208 and solder collector tube 72. The thermal characteristics of tube 208 are such that it preferably has low heat conductivity and/or high specific heat. As can be appreciated, the thermal characteristics of tube 208 can be independently chosen with respect to those of tube 202 of tip 12. Hence, the separate functions of (1) maintaining the solder in a molten state and (2) providing a seal for the front end of solder collector tube 72 can be readily implemented due to the fact that two separate rearward paths from core 50 (or heater 52) are provided for these purposes.

Figure 7:
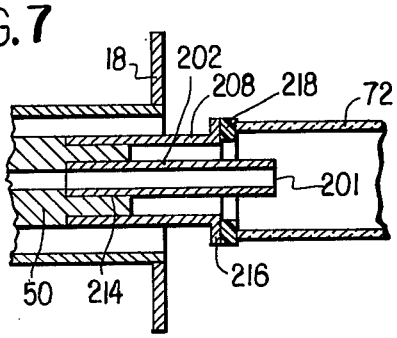
FIGS. 7-10 are cross-sectional views of further illustrative modifications of the embodiment of FIG. 6.

The embodiment of FIG. 7 corresponds to that of FIG. 6 in that two separate paths are provided for the two above-mentioned functions. The FIG. 7 embodiment is different in that tube 202 is not integrally formed with tip 12. Rather, it is nested in seat 214 formed in core 50. Further, mounting tube 208 is flanged at 216 whereby a face seal 218 may be employed for the front end of solder collector tube 72, this arrangement corresponding to the employment of face seal 204 in the embodiments of FIGS. 2-5. It should be understood that a radial seal arrangement could also be employed in the embodiments of FIGS. 2-5 if so desired.

Figure 8:
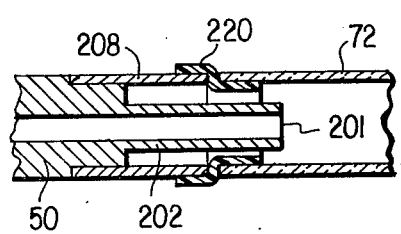

FIG. 8 differs from the FIG. 6 embodiment in that transfer tube 202 is integrally formed with core 50 in a manner similar to that of FIG. 2. Further, a radial seal 220 is employed as shown to provide an appropriate seal between mounting member 208 and solder collector tube 72.

Figure 9:
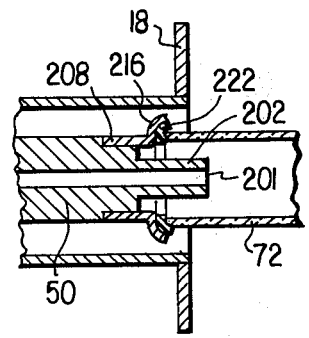

In the embodiment of FIG. 9, tube 202 is also integral with core 50. Flange 216 of mounting tube 208 is provided with a curved portion which is adapted to receive a chamfered seal 222 which, in turn, receives the forward edge of solder collector tube 72 to thereby enhance the connection between mounting tube 208 and collector tube 72. Further, as can be appreciated in the drawing, the seal 222 is located forward of plate 18 in a manner similar to the embodiment of FIG. 3. It should be appreciated that although the seals are shown at various locations within the desolderer, it is to be understood that the seals shown in the various Figures of the drawing may be located either forward of air space 16 as in FIGS. 3 or 9, within air space 16 as in FIGS. 1, 5, 6 and 7 or behind air space 16 within handle 32 as in FIG. 1. However, as stated hereinbefore it is preferable to position the seal in front of handle 32—that is, typically within air space 16 or sleeve 62.

Figure 10:
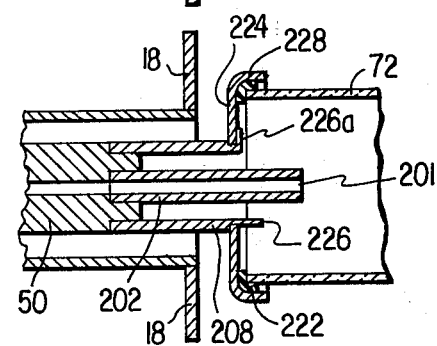

FIG. 10 corrresponds to FIG. 6 where there is provided a flange 224 mounted on mounting tube 208. As indicated at 226, a stepped portion provides a seat upon which flange 224 is placed. Stepped portion 226 is then bent as indicated at 226a to provide a vacuum tight fit between the flange 224 and tube 208. Of course, portion 226 would be bent completely about the opening in flange 224. However, it is illustrated in its unbent state in the lower portion of FIG. 10 for purposes of illustration. Flange 224 may also be connected to tube 208 by brazing or in some other manner which results in an air-tight connection. Flange 224 may be provided with a curved portion 228 corresponding to the curved portion of flange 216 of FIG. 9 whereby chamfered seal 222 provides a seal between flange 224 and solder collector tube 72.

In the embodiments of FIGS. 6-10, the materials, dimensions, etc. of transfer tube 202 and mounting tube 208 may be independently selected to thereby optimize the functions performed by each of these paths as discussed above. Further, it is to be understood that the various sealing arrangements described in the embodiments of FIGS. 2-10 and the other embodiments of this invention can be freely employed in any other embodiment as can the variations illustrated in FIG. 9, for example, such as the curved portion 216 and chamfered seal 222.

In FIG. 11, there is illustrated a further embodiment of the invention which differs from the embodiments of FIGS. 6-10 in that in the embodiments of FIGS. 6-10, there are provided three rearward paths from heater 52—that is, (1) a support path including sleeve 62, plate 18, screws 22, hub 28 and handle 32; (2) a solder transfer path including core 50, tube 208 and (3) a sealing path including core 50, mounting tube 208 and solder collector tube 72. In the embodiment of FIG. 11, there are but two rearward paths from heater 52—namely, (1) sleeve 62, plate 18, screws 22, hub 28 and handle 32 and (2) core 50 and portion 202. Yet in the FIG. 11 embodiment, the functions of (1) maintaining the solder in a molten state and (2) providing a forward seal for solder collector tube 72 are implemented via two separate paths in a manner corresponding to that of FIG. 6. The number of rearward paths from heater 52 is reduced to two paths because sleeve 62 (or an element connected thereto) is also utilized to provide a surface upon which the forward end of solder collector tube 72 may be sealed. Thus, sleeve 62 does not terminate at plate 16 as shown in the embodiments of FIGS. 1, 2 and 6 but rather extends rearwardly to provide a mounting tube 208 which may be integral with sleeve 62. The tube 208 may be flanged in a manner similar to that shown in FIGS. 7, 9 or 10 or it may take any of the forms shown in the other Figures of the drawing or any other appropriate form. The flanged portion is shown at 216 and receives a seal 230 which is adapted to provide a vacuum tight passageway for lead wire 36 connected to heater 52. Alternatively, solder collector tube 72 may be provided with a vacuum tight fitting at point M to permit the passage of the wire 36. Preferably, the point M should be located in front of the rear end portion 201 of portion 202. However, it is also within the scope of the present invention to provide a vacuum tight fitting at the rear of solder collector tube 72 in vacuum fitting 19 whereby the wires 36 would extend through tube 72 to heater 52 where the wire would preferably be attached to the interior wall of tube 72. Further, it is within the scope of the present invention to provide an appropriate electrical source 232 as indicated in dotted lines within the desolderer to provide power for heater 52. It is also possible to provide a vacuum tight connection at point N whereby the wire 36 would pass through sleeve 62 at a point behind plate 18 or at a point P where it would pass through the sleeve at a point in front of plate 16 and where an appropriate opening would be provided in plate 18. Reference is made to U.S. Pat. Nos. 2,170,393, 2,445,196, 2,672,500 and 2,780,704 which are illustrative of various techniques which may be employed to hermetically pass wire 36 into the vacuum chamber to heater 52 where, of course, other known techniques may be employed.

Preferably in the embodiment of FIG. 11, sleeve 62 is made of a low heat conductivity/high specific heat material of the type described hereinbefore although only tube 208 may be of this type material. Hence, the temperature at seal 230 can be controlled. Further, transfer tube 202 should be made of a high heat conductivity/low specific heat material to ensure that the solder remains in a molten state until after it is ejected into solder collector tube 72 although, as indicated hereinbefore, if tube 201 is sufficiently short, it could also be made of a low heat conductivity/high specific heat material. Also in FIG. 11, the wire 49 of heater element 52 is disposed toward the front of the element to further direct heat flow toward tip 12 where this approach may also be employed in the other embodiments of the invention.

In the embodiment of FIG. 12, seal 230 is disposed on plate 18. Preferably plate 18 in this embodiment is made of a low heat conductivity/high specific heat material.

Typically plate 18 may be brazed onto sleeve 62 to ensure a vacuum tight fitting.

In FIG. 13, there is illustrated an embodiment where a vacuum tight fitting 234 is disposed to the rear of plate 18 in tube 208. As stated above, such a fitting may be disposed at various places including points M, N and P of FIG. 11 or in vacuum fitting 19.

In the embodiment of FIG. 14, seal 230 is disposed on the inner wall of sleeve 62 where the sleeve substantially terminates at plate 18 although it is to be understood that sleeve 62 may extend beyond plate 18 in this embodiment and in all other embodiments of the invention such as those of FIGS. 2-10.

In FIG. 15, vacuum tight fitting 234 is disposed in front of plate 18 as discussed hereinbefore with respect to point P of FIG. 11. Further, seal 216 is disposed on the inner wall of tube 208 to provide a forward seal for solder collector tube 72.

Although tube 208 is shown as an integral portion of sleeve 62 in the embodiments of FIGS. 11-15, it is to be understood tube 208 can be a discrete part and that the various mounting techniques illustrated in FIGS. 2-10, for example, may be utilized with respect to tube 208 or any other appropriate mounting techniques.

As stated hereinbefore, the present invention is directed not only to a desolderer but also to a heater assembly for use therewith. Broadly speaking, the tubular core 50 and solder transfer tube 202 may be considered solder transfer means (other equivalent solder transferring means being contemplated) where the heater assembly would broadly comprise heating element 52 and the above mentioned solder transfer means. The solder transfer means is illustrated in the drawing as being coaxially disposed within tubular heating element 52 although it is to be understood that heating element 52 need not be tubular nor need the solder transfer means be disposed within the heating element 52. Thus, the heating element may be disposed in a side-by-side, parallel relationship with the solder transfer means or it may be disposed in an angular relationship with respect thereto as illustrated in aforementioned U.S. Pat. No. 3,163,145. In addition to heating element 52 and the above mentioned solder transfer means, the heater assembly may optionally include, for example, sleeve 62, tip 12 and seal mounting means 208.

What is claimed is:
1. A desolderer comprising
 a tubular tip adapted for contacting a termination to be desoldered;
 a heating element for heating said tip to a solder melting temperature;
 a solder collection chamber;
 a tubular solder transfer means for transferring solder from said tip to said solder collection chamber, said heating element heating said solder transfer means to said solder melting temperature;
 a tubular sleeve within which is disposed said heating element and said solder transfer means;
 said solder collection chamber being adapted for connection to a vacuum source so that a vacuum is established in said tip, said solder transfer tube and said solder collection chamber;
 sealing means for sealing the forward end of said solder collection chamber with respect to at least the rear portion of the tubular sleeve to ensure the application of said vacuum to said solder transfer means from said vacuum source through said solder collection chamber;

electrical wires adapted for connection to an electrical power source; and means for hermetically passing the electrical wires from a point outside said vacuum to a point within said vacuum and hence to said heating element.

2. A desolderer as in claim 1 where said thermal characteristics of the tubular solder transfer means are such that the said rear portion thereof reaches the solder melting temperature within three minutes of said tip reaching the solder melting temperature.

3. A desolderer as in claim 2 where said thermal characteristics are such that the solder melting temperature is reached within one minute.

4. A desolderer as in claim 1 including a handle, said solder collection chamber being substantially disposed within said handle, the said forward end of the solder collection chamber being disposed in front of the handle as are said sealing means for the forward end of the solder collection chamber and the said rear portion of the solder transfer means.

5. A desolderer as in claim 1 where said heating element is tubular and said solder transfer means extends through the tubular heating element.

6. A desolderer as in claim 5 where said tip and said solder transfer means are integrally connected to one another.

7. A desolderer as in claim 5 where said solder transfer means includes a tubular core upon which said heating element is mounted, said tip being disposed at least within the forward portion of said tubular core.

8. A desolderer as in claim 7 where said solder transfer means further includes a solder transfer tube connected to the rear portion of said tubular core.

9. A desolderer as in claim 8 where the connection between said tubular core and said solder transfer tube is integral.

10. A desolderer as in claim 8 where said tip and said solder transfer tube are integrally connected to one another.

11. A desolderer as in claim 1 where said sealing means for the forward end of the solder collection chamber is removed from said solder transfer means and the thermal characteristics of said sealing means is such that the sealing means can be maintained at a temperature less than that of the solder transfer means to thereby promote seal longevity and yet maintain the solder in a molten state as it is ejected into the solder collection chamber.

12. A desolderer as in claim 4 including spacer means for providing an air space between said tubular sleeve and said handle.

13. A desolderer as in claim 12 where said sealing means and said rear portion of the solder transfer means are disposed within said air space.

14. A desolderer as in claim 12 where said sealing means and said rear portion of the solder transfer means are disposed within said tubular sleeve.

15. A desolderer as in claim 1 where said heating element includes resistance wire disposed in the front of the element to preferentially direct heat flow to said tubular tip.

16. A desolderer as in claim 12 where said spacer means comprises a flange so mounted on said sleeve that heat is radiated by said flange from said sleeve before it reaches said sealing surface.

17. A desolderer as in claim 1 where said sealing means is mounted directly on said sleeve.

18. A desolderer comprising a tubular tip adapted for contacting a termination to be desoldered;

a heating element for heating said tip to a solder melting temperature;

a solder collection chamber;

a tubular solder transfer means for transferring solder from said tip to said solder collection chamber;

said solder collection chamber being adapted for connection to a vacuum source so that vacuum applied to said solder collection chamber causes molten solder to be drawn through said tip and said solder transfer tube into said solder collection chamber;

sealing means for sealing the forward end of said solder collection chamber to ensure the application of said vacuum to said solder transfer tube from vacuum source through said solder collection chamber;

a seal mounting means providing a sealing surface for said sealing means for the forward end of the solder collection chamber, said sealing surface being removed from said solder transfer means and the thermal characteristics of said seal mounting means being such that the sealing means can be maintained at a temperature less than that of the solder transfer means to thereby promote seal longevity and yet maintain the solder in a molten state as it is ejected into the solder collection chamber;

a tubular sleeve within which is disposed said heating element and said solder transfer means, at least the rear portion of the sleeve comprising said seal mounting means;

electrical wires adapted for connection to an electrical power source; and means for hermetically passing the electrical wires from a point outside said vacuum to a point within said vacuum and thence to said heating element.

19. A desolderer as in claims 1 or 18 where the thermal conductivity of said tubular sleeve is less than that of said solder transfer means.

20. A desolderer as in claim 19 where said tubular solder transfer means includes a tubular core upon which said heating element is mounted, said tip being disposed at least within the forward portion of said tubular core.

21. A desolderer as in claim 20 where said solder transfer means further includes a solder transfer tube connected to the rear portion of said tubular core.

22. A desolderer as in claim 21 where the thermal conductivity of said tubular core is greater than that of said solder transfer tube.

23. A heater assembly for a desolder having a tubular tip adapted for contacting a termination to be desoldered, a solder collection chamber and sealing means for vacuum sealing the forward end of said solder collection chamber, said heater assembly comprising a heating element adapted for connection to electrical wires for heating said tip to a solder melting temperature;

a tubular solder transfer means adapted for receiving said tip to transfer solder from the tip to said solder collection chamber, said heating element heating said solder transfer means to said solder melting temperature;

means for hermetically passing the electrical wires from (a) a point outside a vacuum established from said tip through said tubular solder transfer means to said solder collection chamber to (b) a point within said vacuum and thence to said heating element.

24. A heater assembly as in claim 23 where said heating element heats said solder transfer means to said solder melting temperature along the entire length thereof so that said solder is ejected from said solder transfer means into the solder collection chamber in a molten state, the thermal characteristics of said solder transfer means being such that the rear portion thereof disposed adjacent said solder collection chamber is (a) maintained at a temperature less than that of said tip and (b) heated to said solder melting temperature shortly after said tip reaches the solder melting temperature.

25. A heater assembly as in claim 24 where said thermal characteristics of the tubular solder transfer means are such that the said rear portion thereof reaches the solder melting temperature within three minutes of said tip reaching the solder melting temperature.

26. A heater assembly as in claim 25 where said thermal characteristics are such that the solder melting temperature is reached within one minute.

27. A heater assembly as in claim 24 where said heating element is tubular and said solder transfer means extends through the tubular heating element.

28. A heater assembly as in claim 27 where said tip and said solder transfer means are integrally connected to one another.

29. A heater assembly as in claim 27 where said solder transfer means includes a tubular core upon which said heating element is mounted, said tip being disposed at least within the forward portion of said tubular core.

30. A heater assembly as in claim 29 where said solder transfer means further includes a solder transfer tube connected to the rear portion of said tubular core.

31. A heater assembly as in claim 30 where the connection between said tubular core and said solder transfer tube is integral.

32. A heater assembly as in claim 30 where said tip and said solder transfer tube are integrally connected to one another.

33. A heater assembly as in claims 23 where said heating element includes resistance wire disposed in the front of the element to preferentially direct heat flow to said tubular tip.

34. A heater assembly as in claim 23 including a tubular sleeve within which is disposed said heating element and said solder transfer means.

35. A heater assembly as in claim 34 where the thermal conductivity of said tubular sleeve is less than that of said solder transfer means.

36. A heater assembly as in claim 35 where said tubular solder transfer means includes a tubular core upon which said heating element is mounted, said tip being disposed at least within the forward portion of said tubular core.

37. A heater assembly as in claim 36 where said solder transfer means further includes a solder transfer tube connected to the rear portion of said tubular core.

38. A heater assembly as in claim 37 where the thermal conductivity of said tubular core is greater than that of said solder transfer tube.

39. A heater assembly for a desolderer having a tubular tip adapted for contacting a termination to be desoldered, a tubular solder collection chamber, sealing means for vacuum sealing the forward end of said solder collection chamber, and a tubular handle within which is disposed said tubular solder collection chamber, said chamber being spaced from and substantially coaxial with the handle, said heater assembly comprising a heating element for heating said tip to a solder melting temperature; and a tubular core upon which said heating element is mounted, said tip being disposed at least within the forward portion of the tubular core;

a tubular solder transfer means connected to the rear portion of said tubular core and extending into the solder collection chamber;

a seal mounting means providing a sealing surface for said sealing means for the forward end of the solder collection chamber, said sealing surface being spaced and separate from said tubular handle and being removed from said solder transfer means and the thermal characteristics of said seal mounting means being such that the sealing means can be maintained at a temperature less than that of the solder transfer means to thereby promote seal longevity and yet maintain the solder in a molten state as it is ejected into the solder collection chamber; and a tubular sleeve connected to the forward portion of the tubular core and within the tubular sleeve being disposed said heating element, said core and said solder transfer means, at least the rear portion of the sleeve comprising said seal mounting means wherein said sealing means is in direct contact therewith and where the axis of the tubular sleeve substantially coincides with (a) the axis of the passageway formed through said tip, said core and said solder transfer means and (b) the axes of the handle and the solder collection chamber, so that a vacuum is established in said tip, said core, said solder transfer means and said solder collection chamber in response to said solder collection chamber being connected to a vacuum source.

40. A heater assembly as in claim 39 where the power source for said heating element is disposed within a vacuum established from said tip through said tubular solder transfer means to said solder collection chamber.

41. A desolderer comprising a tubular tip adapted for contacting a termination to be desoldered;

a heating element for heating said tip to a solder melting temperature;

a solder collection chamber;

a tubular core upon which said heating element is mounted, said tip being disposed at least within the forward portion of said tubular core;

a solder transfer tube connected to the rear portion of said tubular core;

a tubular sleeve connected to said forward portion of the tubular core, said heating element, said core and said solder transfer tube being disposed within said tubular sleeve where the axis of the tubular sleeve substantially coincides with the axis of a passageway formed through said tip, said tubular core and said solder transfer tube; sealing means for sealing the forward end of said solder collection chamber with respect to at least the rear portion of the tubular sleeve;

said solder collection chamber being adapted for connection to a vacuum source so that a vacuum is established in said tip, said core, said solder transfer tube and said solder collection chamber; and said solder transfer tube being completely free of any sealing means disposed thereon.

42. A desolderer as in claim 41 where the thermal conductivity of said tubular core is greater than that of the tubular sleeve.

43. A desolderer as in claim 41 or 42 where the thermal conductivity of said tubular core is greater than that of said solder transfer tube.

44. A desolderer as in claim 41 where the thermal conductivity of said tubular core is greater than that of the tubular sleeve.

45. A heater assembly for a desolderer having a tubular tip, a solder collection chamber and sealing means for vacuum sealing the forward end of the solder collection chamber, comprising a heating element for heating said tip to a solder melting temperature;

a tubular core upon which said heating element is mounted, said tip being disposed at least within the forward portion of said tubular core;

a solder transfer tube connected to the rear portion of said tubular core;

a tubular sleeve connected to said forward portion of the tubular core, said heating element, said core and said solder transfer tube being disposed within said tubular sleeve where the axis of the tubular sleeve substantially coincides with the axis of a passageway formed through said tip, said tubular core and said solder transfer tube;

said sealing means sealing the forward end of said solder collection chamber with respect to at least the rear portion of the tubular sleeve; and said solder transfer tube being completely free of any sealing means disposed thereon.

46. A desolderer as in claim 45 where the thermal conductivity of said tubular core is greater than that of the tubular sleeve.

47. A desolderer as in claims 45 or 46 where the thermal conductivity of said tubular core is greater than that of said solder transfer tube.

48. A desolderer comprising a tubular tip adapted for contacting a termination to be desoldered;

a heating element for heating said tip to a solder melting temperature;

a tubular solder collection chamber;

a tubular core upon which said heating element is mounted, said tip being disposed at least within the forward portion of said tubular core;

a solder transfer tube connected to the rear portion of said tubular core and extending into the solder collection chamber;

a tubular sleeve connected to said forward portion of the tubular core, said heating element, said core and said solder transfer tube being disposed within said tubular sleeve where the axis of the tubular sleeve substantially coincides with the axis of a passageway formed through said tip, said tubular core and said solder transfer tube;

sealing means for sealing the forward end of said solder collection chamber with respect to at least the rear portion of the tubular sleeve wherein said sealing means is in direct contact with said rear portion;

a tubular handle within which is disposed said tubular solder collection chamber, said chamber being spaced from and substantially coaxial with the handle where the axes of the handle and the chamber substantially coincide with said axis of the tubular sleeve, said tubular sleeve being mounted with respect to said handle, said handle being spaced and separate from said sealing means; and said solder collection chamber being adapted for connection to a vacuum source so that a vacuum is established in said tip, said core, said solder transfer tube and said solder collection chamber.

49. A desolderer as in claims 48 or 44 where the thermal conductivity of said tubular core is greater than that of said solder transfer tube.

* * * * *